Figure 1:
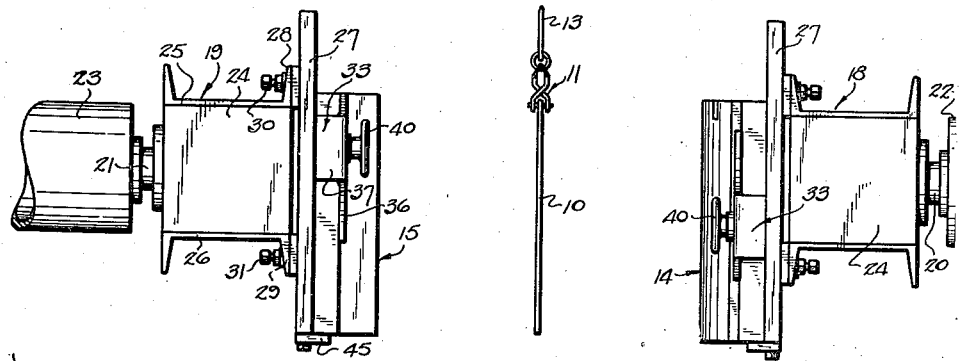

Sept. 28, 1943.   A. McK. GREAVES-WALKER   2,330,279
APPARATUS FOR USE IN THE SHAPING OF GLASS SHEETS OR PLATES
Filed March 27, 1940

Inventor
ARTHUR McK. GREAVES-WALKER.
By Frank Fraser
Attorney

Patented Sept. 28, 1943

2,330,279

UNITED STATES PATENT OFFICE 2,330,279

APPARATUS FOR USE IN THE SHAPING OF GLASS SHEETS OR PLATES

Arthur McK. Greaves-Walker, Toledo, Ohio, assignor to Libbey-Owens-Ford Glass Company, Toledo, Ohio, a corporation of Ohio Application March 27, 1940, Serial No. 326,228

3 Claims. (Cl. 49—67)

The present invention relates in general to the shaping of glass sheets or plates to a predetermined curvature and to improvements in shaping molds.

Heretofore, it has been the usual practice to bend glass sheets either in sand molds or metal molds. The sheet is placed horizontally upon the mold in a furnace and the temperature of both the mold and sheet raised until the glass becomes softened and drops downwardly by gravity to conform to the shape of the mold. The bending of glass sheets in this manner is, however, relatively slow and laborious and such method of bending does not readily lend itself to large scale production.

It is an aim of this invention to overcome the objectionable features incident to the old methods of bending and to render possible the shaping of glass sheets or plates more cheaply, rapidly, and accurately than heretofore and to give a product whose surfaces are smooth and exactly parallel to each other and in no way impaired by the shaping operation.

In carrying out this invention, the glass sheet or plate to be bent is first heated in a furnace and preferably while suspended in a vertical position to a temperature approximating the softening temperature of the glass, after which the highly heated sheet or plate is removed from the furnace and, while still vertically suspended, is pressed to a predetermined curvature by bringing into contact with opposite surfaces thereof suitably shaped male and female pressure elements or shaping molds. The shaping molds are in the nature of forming dies and are adapted to engage opposite surfaces of the glass sheet only momentarily; that is to say, only sufficiently long to effect the shaping thereof. The period of contact of the shaping molds with the glass surfaces is ordinarily less than a second. Thus, this method of shaping glass sheets may be termed "die stamp bending" as it is similar to the cold shaping of metal sheets by a die stamping operation.

By maintaining the glass sheet in a vertical position during the heating and shaping operations, the sheet is prevented from sagging and contacting unduly with surfaces which might mar the same, such as would be the case if the sheet were heated and bent while in a horizontal position. Further, by supporting the glass sheet vertically, and especially by the suspending means herein disclosed, the sheet is free to move under the action of the shaping molds thereby minimizing any tendency of the sheet to become distorted, such as would occur if the sheet were held in a fixed or immovable support.

According to my invention, the shaping molds are formed from a plaster composition such as plaster of Paris or gypsum plaster. The use of plaster molds for shaping glass sheets according to the method herein disclosed is of decided advantage over the use of molds of other materials such as sand molds, iron molds, or wood molds. Obviously, sand molds can not be employed in the vertical bending of glass sheets. On the other hand, iron molds can not be satisfactorily used in this method of shaping glass sheets due to the difficulty of maintaining an accurate shape under elevated temperatures. Iron, of course, will grow under heat and because of such growth is uncontrollable. In the method herein provided for shaping glass sheets, a variation of ten thousandths of an inch in the mold surface has an adverse effect on the finished glass shape. Also, in this method, different portions of the molds engage the heated glass sheet different lengths of time and due to this, iron mold surfaces become distorted as different areas thereof are heated to different temperatures as a result of which the accuracy of the molds is quickly lost. Further, iron molds must be preheated before being brought into engagement with the glass sheets to avoid chill cracks in the glass, which are the result of a greater withdrawal of heat from one portion of the sheet than another. In addition, iron molds have no "give" and therefore tend to produce pressure cracks in the glass sheet due either to ununiform thickness of the sheet or distortion of the molds. Moreover, iron molds are quite heavy; are inconvenient to handle and install; and are generally unsatisfactory for use in the vertical bending of glass sheets.

Wooden molds are also very apt to become distorted from the heat to which they are subjected in the bending operation. In drying, wood has a tendency to shrink and as this shrinkage takes place at elevated temperatures the accuracy of the mold is lost. Further, the hard and soft graining in wooden molds is apt to show on the glass until the surfaces become charred. However, when charred, the wooden surfaces become so soft that they are readily worn away by the bending operation and deteriorate quite rapidly under operating conditions.

On the other hand, I have found, by actual commercial use, that shaping molds formed of a plaster composition such as plaster of Paris or gypsum plaster can be satisfactorily employed in the shaping of glass sheets by the vertical method of bending herein disclosed and that they are, in fact, far superior to either iron molds or wooden molds. For instance, plaster molds are readily formable to an accurate predetermined shape and may be easily duplicated. Also, such molds will readily withstand the elevated temperatures to which they are subjected and will not become distorted or lose their accuracy even though different portions thereof engage the heated glass sheet different lengths of time during the bending operation. Further, plaster molds will not mar the glass surfaces and have a long life through repeated bending cycles. Plaster molds also do not require preheating nor do they become charred at elevated temperatures. In addition, due to their insulating qualities, plaster molds do not cause chill cracks in the glass and because of their "give" they do not produce pressure cracks. A still further advantage of plaster molds is the ease with which the bending faces thereof may be redressed for radii and surface corrections.

Other objects and advantages of the invention will become more apparent during the course of the following description, when taken in connection with the accompanying drawing.

Figure 2:
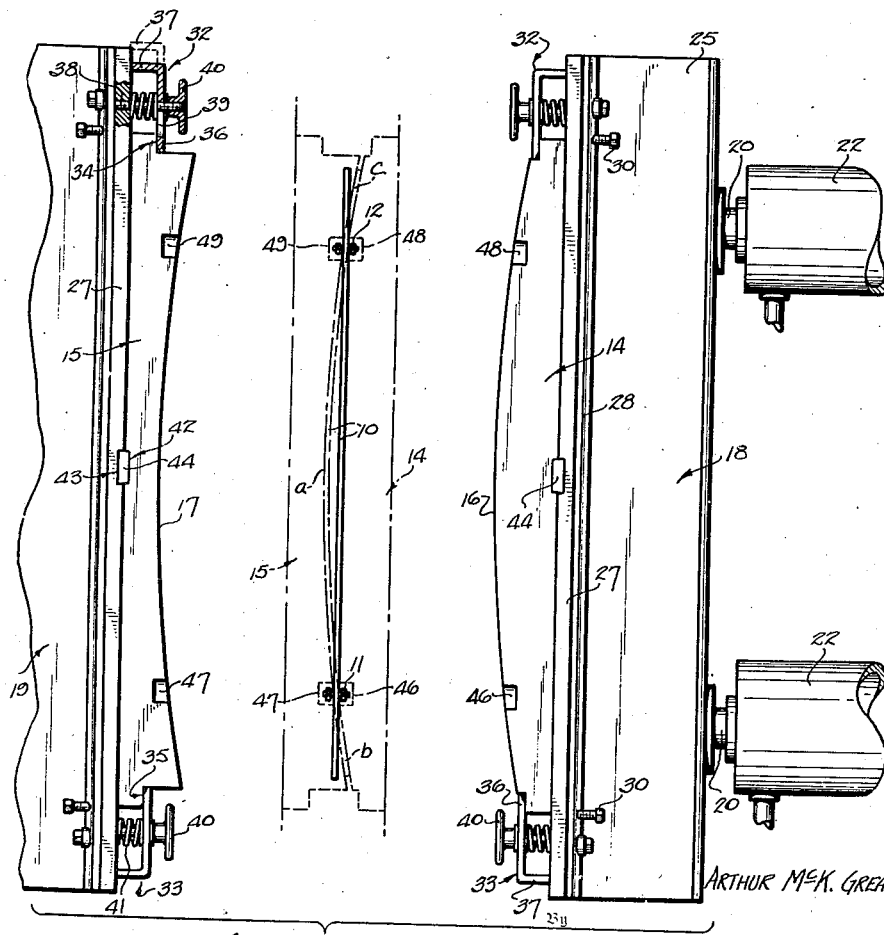

In the drawing, wherein like numerals are employed to designate like parts throughout the same:

Fig. 1 is an end elevation of a pair of shaping molds provided by the present invention and shown in position for bending a glass sheet therebetween; and Fig. 2 is a plan view thereof.

With reference now to the drawing, a flat sheet of glass 10 to be bent is suspended vertically by a pair of relatively small hooks or tongs 11 and 12 which engage the sheet adjacent its upper edge and also adjacent the opposite ends thereof. These hooks or tongs may be attached by any suitable means 13 to any desired type of support. The flat sheet of glass 10, suspended vertically by means of the tongs 11 and 12, is first heated in a furnace (not shown) until the temperature of the sheet preferably approximates the softening temperature of the glass. The sheet of glass is then removed from the furnace and is immediately bent to the desired curvature.

The shaping of the glass sheet is accomplished by pressing it between the male and female pressure elements or shaping molds 14 and 15 respectively, while still suspended in a vertical position from the tongs 11 and 12. As shown, the shaping molds are disposed at opposite sides of the sheet, with the male mold 14 being provided with a convex bending face 16, and the female mold 15 with a complemental concave bending face 17. Upon horizontal movement of the molds 14 and 15 toward one another, the opposite surfaces of the glass sheet 10 are adapted to be simultaneously engaged by the bending faces 16 and 17 of the molds and the said sheet bent to a predetermined curvature therebetween. The shaping molds 14 and 15 are removably carried by the supporting structure 18 and 19 respectively having associated therewith horizontal plungers 20 and 21 operating within cylinders 22 and 23 respectively; the horizontal reciprocating movement of said plungers being controlled in any well known manner by hydraulic or air pressure within said cylinders.

Inasmuch as the supporting structure 18 and 19 for the shaping molds 14 and 15 are of the same construction, a description of only one will be given. Thus, each supporting structure includes a horizontal longitudinally extending supporting bar 24 to which the respective horizontal plungers 20 or 21 are secured. Extending along and secured to the upper and lower surfaces of the supporting bar 24 are the channel beams 25 and 26. Arranged inwardly of the supporting bar 24 is a longitudinally extending vertical metal attaching plate 27 which is secured to the flanges 28 and 29 of the channel beams 25 and 26 respectively by screws, bolts, or other suitable fastening means 30 and 31. The front surface of the attaching plate 27 is flat, as is also the back face of the respective shaping mold so that the back face of the mold fits tightly against the front surface of the attaching plate.

The shaping mold is secured to the attaching plate by clamping means 32 and 33 arranged at opposite ends of the mold and engaging shoulders 34 and 35 respectively formed thereon. Each clamping means 32 and 33 comprises an angle member having a front portion 36 and a rearwardly directed end portion 37; the front portion 36 overlapping and engaging the respective shoulder 34 or 35 on the mold, while the end portion 37 engages the front surface of the attaching plate 27. Carried by the attaching plate is a forwardly extending bolt 38 passing through a slot 39 in the front portion 36 of the clamping member and having threaded thereon a nut 40. By tightening the nuts 40 of clamping means 32 and 33, the front portions 36 of the clamping members will engage the shoulders 34 and 35 on the mold and act to clamp said mold firmly against the attaching plate.

In order to automatically disengage the clamping members from the shaping mold upon loosening of the nuts 40, there is provided a compression spring 41 encircling each bolt 38. When the nuts 40 are loosened, the springs 41 will urge the clamping members outwardly so that they can be readily moved laterally by the operator to broken line position indicated in Fig. 2, whereupon the mold can be readily removed. It is essential in the shaping of glass sheets according to this method that the male and female shaping molds 14 and 15 be in perfect alignment with one another both vertically and horizontally. This is especially true in the making of compound bends in vertical and horizontal directions. To facilitate the positioning of the shaping molds with respect to the attaching plates 27 and to also line up the two molds vertically with one another, each mold and attaching plate are provided with mating vertical grooves 42 and 43 respectively for receiving therein a key 44. For the purpose of supporting the molds and for aligning them horizontally with one another, there is secured to the bottom edge of each attaching plate 27 a horizontal metal supporting strip 45 upon which the bottom edge of the mold rests. Thus, rapid and accurate installation of the mold in the machine is provided for.

The shaping molds 14 and 15 are preferably of such size, both as to height and width, that the glass sheet 10 when brought into position therebetween for bending is disposed entirely within the area of the molds. That is to say, the glass sheet does not project beyond the molds either at the top or bottom or at the opposite sides thereof, as will be seen in the drawing. It has been found that when the glass sheet is arranged in this manner the liability of breaking or cracking of the glass during bending is reduced. When the glass sheet projects either above or beneath the molds so that said molds do not engage the entire area of the sheet, there is a tendency for so-called chill cracks to develop in the glass.

In order to suspend the glass sheet in this manner between the shaping molds, it is of course necessary that the lower ends of the hooks or tongs 11 and 12 be disposed between the upper portions of said molds as seen in Fig. 1. To permit the molds to be moved together to effect the shaping of the glass sheet without interference from the said tongues, the male and female molds 14 and 15 are provided at their upper ends with opposed recesses or notches 46—47 respectively for receiving the tong 11 and with similar recesses or notches 48—49 for receiving the tong 12 when the said molds are moved together. The manner in which the tongs are received within the recesses and also the manner in which the glass sheet is bent upon closing of the molds is clearly shown in broken lines in Fig. 2.

Another feature of the invention consists in the positioning of the tongs 11 and 12 so that upon shaping of the glass sheet the tongs will remain in the same or substantially the same position. The flat sheet of glass 10 to be bent is shown in full lines in Fig. 2, and this sheet is suspended from the hooks or tongs 11 and 12 engaging the same adjacent its opposite vertical side edges. In operation, the male mold 14 is moved inwardly to engage the adjacent surface of the glass sheet 10 at a point intermediate the tongs 11 and 12, while the female mold 15 is simultaneously moved inwardly to engage the opposite side edge portions of the sheet outwardly of the tongs. Upon continued movement of the molds toward one another, the central portion of the glass sheet between the tongs will be bent in one direction as indicated at $a$, while the side edge portions of the sheet outwardly of the tongs will be simultaneously bent in the opposite direction as at $b$ and $c$. This bending operation will continue until the molds are closed and the sheet assumes its final predetermined curvature as shown by the broken lines in Fig. 2. When the molds are closed, the tongs 11 and 12 will be received within the recesses 46—47 and 48—49 respectively in said molds as explained above.

As will be also be apparent from Fig. 2, the tongs 11 and 12 are so arranged prior to the bending of the sheet that they have very little, if any movement during the shaping operation. This is due to the fact that the central portion $a$ of the sheet between the tongs is bent in one direction in an amount substantially equal to the degree of bend of the side edge portions $b$ and $c$ of the sheet in the opposite direction. In other words, the tongs 11 and 12 are so positioned that a line extending parallel to the cord of the curve given the glass sheet and passing through the tongs will bisect the rise or curvature of the glass sheet after bending. The positioning of the tongs will of course depend upon the curvature to be given the glass sheet and the position of the notches in the bending molds will of course also be varied accordingly.

After the glass sheet 10 has been pressed to the desired shape, it can either be annealed by a slow and gradual cooling thereof or, if preferred, the said sheet can be tempered by subjecting it to a sudden cooling or chilling treatment as well known in the art.

As brought out above, the pressure elements or shaping molds 14 and 15 are formed from a plaster composition such as plaster of Paris or gypsum plaster and also that the use of such molds in the shaping of glass sheets according to the method above described is attendant with various important practical advantages over the use of iron or wood molds. Further, that in this method, the shaping molds contact with the glass sheet only long enough to bend it to the desired curvature and that this period of engagement is ordinarily not more than one second. The molds are preferably actuated so that they move to bending position, perform the bending operation, and return to retracted position within about two seconds. Consequently, very little time is required to shape the sheet to its desired form, and, in fact, this method of bending is quite similar to the die stamping of metal sheets. The plaster molds herein provided do not have to be preheated prior to bending and even though certain areas of the molds contact the glass sheet for a longer period of time than others, they still do not become distorted or lose their accuracy or ununiformly cool the sheet, such as is apt to cause chill cracks in the glass.

It might be pointed out here that it has been heretofore proposed to use plaster molds for bending glass sheets according to the old methods of bending, in which the molds and glass sheets are placed in a furnace and heated to a temperature sufficient to cause the glass to soften and conform to the shape of the molds. However, the use of plaster molds in such methods has never proven satisfactory because they rapidly deteriorated under the elevated temperatures to which they were subjected. In such methods, the molds and glass sheets are usually heated to a maximum temperature of around 1200° F. over a twenty-four hour bending cycle. This time and temperature cycle is such that complete calcination (breaking up and loss of bond) of the entire plaster mass takes place before a single commercially satisfactory bend can be made. The plaster molds, when first cast, contain an excess amount of water which is expelled during the drying and setting of the plaster, but there still remains a relatively large percentage of moisture (approximately 20%) after drying and which is chemically combined with the gypsum crystals. When used in the old methods, the elevated temperatures to which the molds were subjected in the furnace was sufficient to drive off the combined water from the mass resulting in complete calcination and disintegration of the molds. Different ways were suggested of protecting the molds from the heat, such as by embedding them in sand, but no way has been found which will permit their use successfully in such methods.

I have discovered, however, that notwithstanding the failure of plaster molds in the old methods of furnace bending, such molds can be satisfactorily employed in the method herein disclosed and in fact with much more satisfactory results than either iron or wood. Thus, if the water which is chemically combined with the gypsum crystals is not expelled during the bending operation, plaster molds can be successfully used in the shaping of glass sheets. In the shaping of glass sheets according to my method, the evaporation of the chemically combined water in the molds is greatly retarded and, in fact, to such an extent that the molds can be used over a relatively long period of time for making a large number of repeated bends accurately and uniformly and without marring the glass.

In the shaping of glass sheets according to my method, the plaster molds are subjected to a body temperature not much in excess of 160° F. except the front face thereof which contacts the heated glass sheet. Further, the plaster molds are exposed to the atmosphere, and due to the fact that they have low thermal conductivity there is relatively little flow of heat from the face of the mold into the body thereof. This insulating quality of the mold increases as the face thereof becomes burned or calcined which further reduces evaporation by retarding the flow of heat from the face of the mold into the body thereof. Evaporation is also retarded by mounting the mold flat against the attaching plate 27. As is well known, moisture runs from heat, and as heat enters the mold through the front face thereof the moisture will run to the back of the mold. However, as the mold lies flat against the metal attaching plate no evaporation is allowed from the rear face of the mold. The rear face and edges of the mold may also be coated with shellac or the like to further impede the loss of moisture from the plaster mass; or, a relatively thin rubber sheet may be arranged between the back of the mold and the metal attaching plate. Therefore, by exposing the plaster mold to the atmosphere, by maintaining it at a body temperature not much in excess of the calcining temperature thereof, which is approximately 140° F., and retarding evaporation of moisture from the rear face of the mold, I have found that such molds can be successfully used in the shaping of glass sheets by the method herein disclosed. These plaster molds will bend the glass without surface distortion and have a high degree of permanency of radius and surface.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In an apparatus for shaping glass sheets, shaping molds of a plaster composition having complemental convex and concave bending faces adapted to engage opposite surfaces of the sheet and to shape said sheet therebetween to the desired curvature, said shaping molds being provided with shoulders at the opposite ends thereof, supporting means for each shaping mold comprising a vertical attaching plate, clamping means carried by each plate and engaging the shoulders on the respective mold for removably clamping said mold upon said attaching plate, and means carried by the attaching plates for lining up the molds both horizontally and vertically.

2. Apparatus for bending a glass sheet suspended in a vertical position and heated to bending temperature, comprising bending molds in the form of precast slabs composed entirely of a plaster composition disposed at opposite sides of the sheet and having complemental convex and concave bending faces adapted to engage opposite surfaces of said sheet to bend the same therebetween to the desired curvature, supporting means for each bending mold including a vertical attaching plate, means engaging each bending mold to removably clamp the same against the respective attaching plate, mating vertical grooves formed in said attaching plate and mold, and a key received in said mating grooves for lining up the two bending molds vertically with one another.

3. Apparatus for bending a glass sheet suspended in a vertical position and heated to bending temperature, comprising bending molds in the form of precast slabs composed entirely of a plaster composition disposed at opposite sides of the sheet and having complemental convex and concave bending faces adapted to engage opposite surfaces of said sheet to bend the same therebetween to the desired curvature, supporting means for each bending mold including a vertical attaching plate, means engaging each bending mold to removably clamp the same against the respective attaching plate, mating vertical grooves formed in said attaching plate and mold, a key received in said mating grooves for lining up the two bending molds vertically with one another, and a horizontal supporting member secured to the bottom of each attaching plate for supporting the respective bending mold and for aligning the said molds horizontally with one another.

ARTHUR McK. GREAVES-WALKER.